May 5, 1931.  F. J. KUBLER  1,804,371

WINDLACE CONSTRUCTION FOR VEHICLES

Filed July 24, 1928

Inventor:
Frederick J. Kubler,
by Emery, Booth, Janney & Varney
Attys.

Patented May 5, 1931

1,804,371

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

WINDLACE CONSTRUCTION FOR VEHICLES

Application filed July 24, 1928. Serial No. 294,988.

Figure 1:
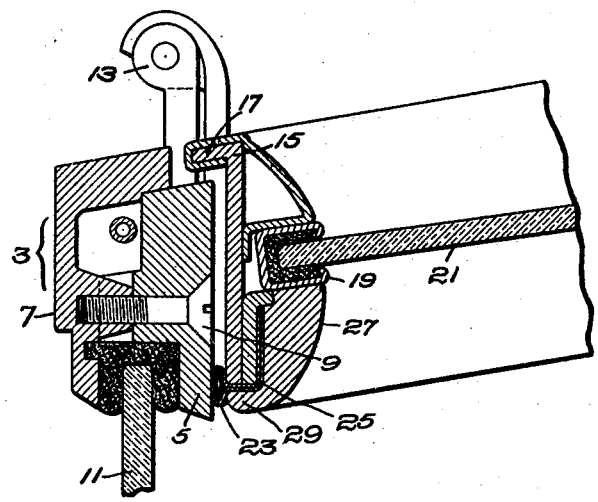
Figure 2:
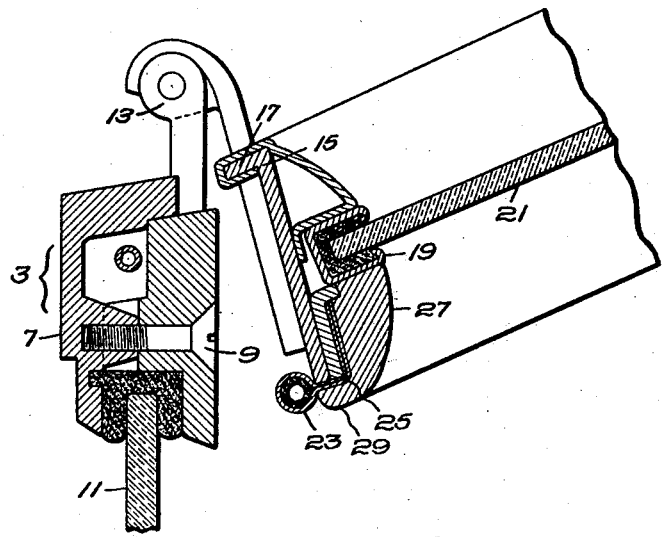

This invention relates to automobile bodies and the object is to provide in such a structure improved means for staunching the joint at the hinge side of the door. My invention will be well understood by reference to the following description of an illustrative embodiment thereof shown by way of example in the accompanying drawings, wherein:

Fig. 1 is a fragmentary plan section of the body pillar at the forward corner of an automobile body of the closed type and of the adjacent door pillar hung thereon showing the door shut; and Fig. 2 is a similar view showing the door partly open.

By way of example I have shown in the accompanying drawing a door body pillar 3 arising adjacent the cowl of the vehicle and here shown as consisting of a main member 5, which may be a drop forging, incorporated with the frame-work of the body below the belt line and a separable finishing section 7, which may be a die casting, secured to the main section by means of screws 9. This particular construction of pillar is not a part of the invention claimed in the present application. In the example of the invention shown the body pillar 3 is the front corner pillar of the body and the sections 5 and 7 provide a suitable seat accommodating the windshield 11. The rear face of the section 5, the righthand face in the drawings, constitutes the jamb face of the door casing. Hung on the pillar 3 by means of suitable hinges 13 is a door which may embody a door hinge pillar 15 conveniently formed of sheet metal and having an overlap flange 17. At the rear face of the door pillar is a channel 19 accommodating the usual sliding glass 21.

In accordance with my invention I provide for staunching the door joint between the jamb face of the body pillar section 5 and the door hinge pillar 15 by means of a suitable compressible member 23 and adapted to be compressed in the door joint when the door is closed, and herein this member is shown as carried on the door pillar to be pressed flatly against the jamb face of the body pillar 5. The member 23 may take the form of a rubber tube and to secure it in place it may be enveloped in suitable flexible material, such as wash leather, providing a flexible securing flap 25. This flap may cross the inner edge of the door hinge pillar 15 and extend over on the inner face thereof and may be secured thereagainst by means of the garnish molding 27 which overlies the inner face of the pillar between the glass channel 19 and the inner face of the door and is provided with a flange 29 extending over the inner edge of pillar 15 to the plane of the jamb face thereof.

The windlace provided by the compressible member 23 may be very simply applied and provides an exceptionally neat finish from the inner surface of the door while when compressed in the manner shown in Fig. 1 it is effective in preventing air or water from penetrating to the interior of the car through the door joint.

Having described a single example of my invention by way of example, what I claim as new and desire to secure by Letters Patent I shall express in the following claims.

1. In an automobile body in combination with the body hinge pillar, a door of the type having a window therein, the hinge pillar of said door being hung on the body hinge pillar and having at one side thereof a glass channel, a garnish molding carried by said pillar at the inner side of said channel and provided with a flange overlying the inner face of the door pillar, and a windlace having a compressible body lying at the jamb face of said door pillar and a securing flap received between said pillar and molding.

2. In combination with a closure member comprising a glazed frame, an angular molding embracing the inner edge of said frame and having one flange extending substantially to the location of the glazing and the other to the edge of the frame, and a windlace comprising a compressible body located at the edge of the frame and having a securing flap clamped between frame and molding.

In testimony whereof, I have signed my name to this specification.

FREDERICK J. KUBLER.